Figure 1:
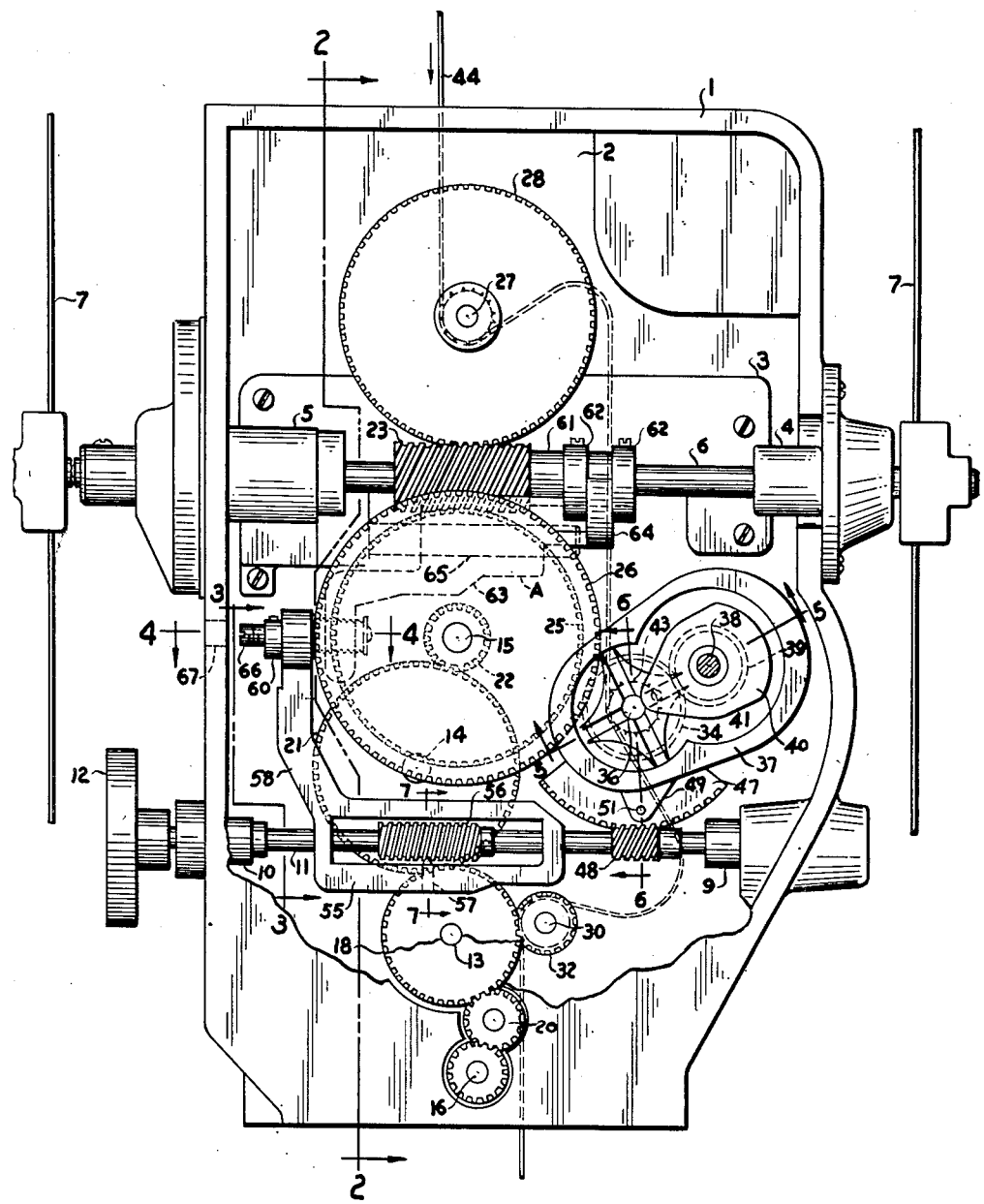

Nov. 27, 1951     K. BRENKERT     2,576,713
COMPENSATING MECHANISM FOR MOTION-PICTURE MACHINES
Filed Aug. 13, 1948     2 SHEETS—SHEET 1

INVENTOR.
KARL BRENKERT.
BY
Samuel Weisman
ATTORNEY.

Nov. 27, 1951     K. BRENKERT     2,576,713
COMPENSATING MECHANISM FOR MOTION-PICTURE MACHINES
Filed Aug. 13, 1948     2 SHEETS—SHEET 2
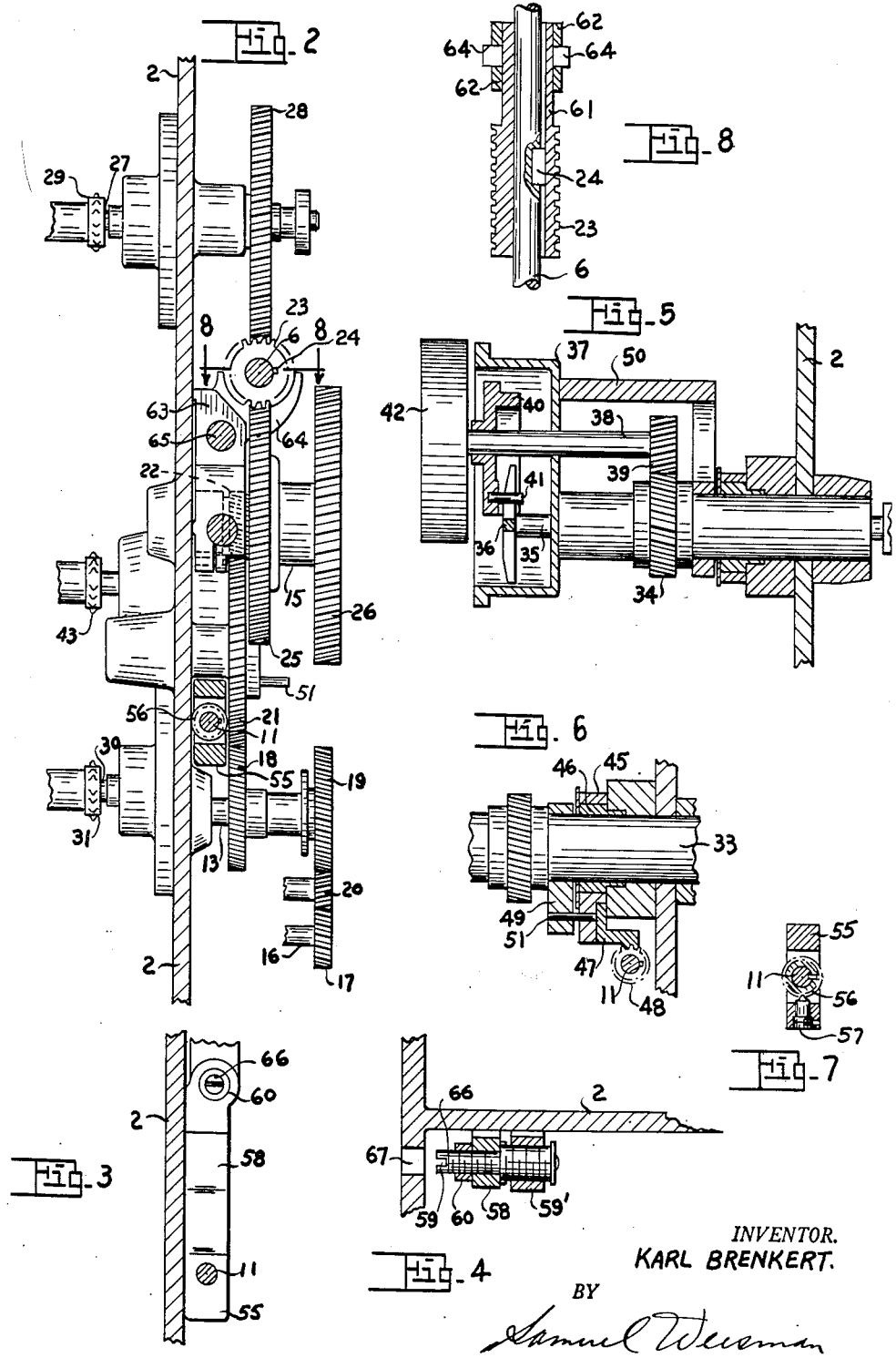
INVENTOR.
KARL BRENKERT.
BY
*Samuel Weseman*
ATTORNEY Patented Nov. 27, 1951

2,576,713

UNITED STATES PATENT OFFICE 2,576,713

COMPENSATING MECHANISM FOR MOTION-PICTURE MACHINES

Karl Brenkert, Detroit, Mich., assignor to Radio Corporation of America, a corporation of Delaware Application August 13, 1948, Serial No. 44,192

3 Claims. (Cl. 88—18)

The present invention pertains to a motion picture machine and particularly to a means for compensating the adjustment of the shutter shaft of a projector simultaneously with an adjustment of the intermittent mechanism in framing the picture.

The prior art discloses the method of framing by an adjustment of the intermittent mechanism, for example, revolving the driving or cam member about the axis of the driven member or star wheel of a Geneva movement. It is also known that this adjustment of the intermittent mechanism calls for a corresponding adjustment or compensation of the shutter, and numerous compensating systems have been proposed.

These systems are relatively complicated, and even the simple ones involve pivoted members such as rocker arms and displaceable gears, with pivot points that eventually wear and introduce inaccuracies in the mechanism.

These rocking members are necessitated in many cases by connections from the revolving member of the intermittent mechanism to the shutter shaft.

The principal object of this invention is to simplify the compensating mechanism and particularly by eliminating the rocking parts and the stated objections thereto. This object is accomplished generally by a construction that communicates the compensating adjustment of the shutter shaft directly from the framing shaft rather than through the revolving member of the intermittent mechanism.

More particularly, the shutter shaft has a spiral or helical gear slidably keyed thereon and in permanent mesh with at least one gear of the gear train. When this gear is slid, the shutter shaft is adjusted. The framing shaft is geared to the intermittent mechanism for adjusting the film, as known in the art, and also carries a screw member connected to the aforementioned helical gear for sliding the latter. This connection includes a slide mounted on the framing shaft and connected to the screw member in a manner to be displaced when the screw member is turned with the framing shaft. The slide has an actuator rigidly connected thereto and also connected to the helical gear on the shutter shaft for sliding the gear.

Another object of the invention is to enable an adjustment of the shutter shaft independently of the framing shaft in the initial setting of the machine. This adjustment is made by means of a connection between the slide and the actuator, preferably a screw that is accessible for turning from the outside of the machine housing.

The invention is fully disclosed by way of example in the following description and in the accompanying drawings in which:

Figure 1 is an elevation of the projector at the mechanism side, the outer wall being broken away to expose the internal parts to view;

Figures 2, 3, 4, 5, 6, 7 are sections on the lines 2—2, 3—3, 4—4, 5—5, 6—6 and 7—7 respectively of Figure 1, and Figure 8 is a section on the line 8—8 of Figure 2.

Reference to these views will now be made by use of like characters which are employed to designate corresponding parts throughout.

In Figure 1 is shown the conventional box-like housing 1 of a conventional projector having an internal wall or a partition 2 that divides the interior of the housing into a film compartment and a mechanism compartment as well known in the art. The present invention is concerned with a construction within the mechanism compartment. For the purpose of locating the gear train and other parts of the mechanism, certain conventional parts will be introduced out of their operative sequence. Somewhat above the horizontal center of the housing 1, the wall or frame member 2 carries a shutter shaft casting 3 formed with a pair of bearings 4, 5 which support the shutter shaft 6. External of the housing 1, the shaft 6 carries shutters 7 and 8 constituting what is known as a front and rear shutter assembly. Below the horizontal center, the end walls of the housing carry alined bearings 9 and 10 which support a framing shaft 11 parallel to the shaft 6. The rear end of the shaft 11, external of the housing, carries a framing knob 12.

Below the shaft 11, a shaft 13 is journalled transversely in the wall 2, and over the shaft 11 are two more transverse shafts 14 and 15 also journalled in the wall 2. The shafts 13, 14 and 15 need not be in vertical alinement. Near the lower end of the housing is journalled a power shaft 16, such as a motor shaft, carrying a pinion 17. The shaft 13 carries two equal gears 18 and 19, the latter being driven from the pinion 17 by an intermediate pinion 20. The gear 18 drives a gear 21 on the shaft 14, and the gear 21 drives a pinion 22 on the shaft 15. On the shutter shaft 6 is slidably mounted a helical gear 23 by a key or spline 24, and this gear meshes with a gear 25 on the shaft 15. The shaft 15 also carries a somewhat larger gear 26 for a purpose that will presently be described.

Above the shutter shaft is a transverse, upper sprocket shaft 27 carrying a gear 28 meshing with the helical gear 23. In the film compartment, the shaft 27 carries the usual upper sprocket 29. Laterally adjacent to the shaft 13 is the lower sprocket shaft 30 supported by the walls 2 and carrying the usual lower sprocket 31 in the film compartment. The shaft 30 also carries a pinion 32 in the mechanism compartment and meshing with the gear 18, as shown in Figure 1.

Laterally adjacent to the gear 26, the wall 2 supports a sleeve or quill 33 on which is loosely mounted a gear 34 meshing with the gear 26. The quill also journals a stub shaft 35 carrying a conventional Geneva or star wheel 36. On the shaft 35 is rockably mounted a housing 37 carrying a shaft 38 on which is fixed a pinion 39 meshing with the gear 34. Within the housing 37, the shaft 38 supports the so-called cam which consists of a radial member 40 carrying a drive pin 41 adapted to enter successively the slots of the star wheel 36 in a manner well known in the art. The shaft 38 also carries a flywheel 42. It is now evident that the cam is in constant rotation through the gears 34 and 39 and that the star wheel 36 and shaft 35 are intermittently driven by the pin 41. The shaft 35 carries the intermittent sprocket 43 (Figure 1), and the film 44 is engaged successively with the sprockets 29, 43 and 31 in a manner familiar in the art.

A framing arm 45 is rotatably mounted on the quill 33 (Figure 6) through the medium of an interposed bearing 46. To a side of the arm 45 is fastened a gear segment 47 meshing with a helical gear 48 fixed on the framing shaft 11. Adjacent to the arm 45 a yoke 49 is swingably mounted on the quill 33 and extended to and secured to the housing 37 as indicated by the numeral 50 in Figure 5. The parts 45 and 49 are joined together by a pin 51. As the framing shaft 11 is turned, the cam shaft 38 is swung about the axis of the intermittent shaft 35, thereby changing the relation between the pin 41 and the star wheel 36 to frame the picture in a manner also known in the art.

It has further been recognized for many years that the framing of the picture requires that the shutter shaft be given an adjustment known as compensation. This means, briefly, an adjustment of the shutter corresponding to the changed relation of the cam pin and star wheel in the continuous gear train, so that the shutter will cut off the light at the proper intervals in the actuation of the film.

The shutter compensating mechanism, to which this invention is primarily directed, includes first a slide 55 in the nature of a frame mounted on the framing shaft 11. To the latter is secured another helical gear 56 engaged by a tooth or pin 57 carried by the slide 55 and extending into the thread of the gear. Consequently, on turning of the framing shaft 11, the slide 55 is moved lengthwise of the shaft. An arm 58 extends upward from the slide 55 and carries a two-diameter screw 59 secured by a lock ring 60. The purpose of the screw is to attach to mechanism for sliding the helical gear 23 on the shutter shaft 6, as will now be described.

The gear 23 has an extended hub 61 to which is attached a pair of spaced collars 62. The larger diameter 59' of the screw 59 threads into an end or tail of an actuator 63, the opposite end of the actuator being formed as a yoke 64 received between the collars 62. The body of the actuator is slidably supported on a rod 65 (Figure 2) carried by the plate or casting 3. Because of this mounting, the slide 55 is held from turning with the shaft 11 and must therefore slide along the shaft as described.

The shifting of the slide 55 transmits a similar longitudinal movement to the gear 23. The sliding of the gear 23 is accompanied by a rotation thereof since it is meshed with the gears 26 and 28. The rotation of the gear 23 is transmitted to the shutter shaft 6 through the spline connection 24. The several gears involved in this operation are dimensioned to make the necessary compensation in the shutter shaft.

The outer end of the screw 59 has a screwdriver slot 66, and adjacent thereto the wall of the housing 1 has an access opening 67. By means of a screwdriver inserted through this opening, a differential movement between the slide 55 and actuator 63 is obtainable for the initial setting of the shutter with respect to the intermittent mechanism. Thereafter, in framing from the shaft 11, the slide and actuator move together, and no further setting of the screw 59 is required. In fact it is preferable to plug the opening 67.

Although a specific embodiment of the invention has been illustrated and described, it will be understood that various alterations in the details of construction may be made without departing from the scope of the invention as indicated by the appended claims.

What I claim is:

1. In a motion picture projector, a housing, a shutter shaft and a framing shaft journalled therein, a shutter fixed non-slidably on said shutter shaft, an intermittent mechanism connected to the framing shaft including a constantly rotating driving member and an intermittently rotating driven member, said driving member being adjustable about the axis of the driven member, means on said framing shaft for effecting such adjustment, a slide on said framing shaft, means on said framing shaft for moving said slide on rotation of the shaft, a helical gear slidably keyed on said shutter shaft, a driving gear in said housing meshing with said helical gear, a rigid actuator extending from said slide to the helical gear for sliding the latter on its shaft, and an adjusting screw joining said actuator to said slide for adjusting said actuator relatively to said slide in a direction parallel to said shutter shaft.

2. In a motion picture projector, a housing, a shutter shaft and a framing shaft journalled therein, a shutter fixed non-slidably on said shutter shaft, an intermittent mechanism connected to the framing shaft including a constantly rotating driving member and an intermittently rotating driven member, said driving member being adjustable about the axis of the driven member, means on said framing shaft for effecting such adjustment, a slide on said framing shaft, means on said framing shaft for moving said slide on rotation of the shaft, a helical gear slidably keyed on said shutter shaft, a driving gear in said housing meshing with said helical gear, an actuator slidably supported by said housing and connected to the helical gear for sliding the latter on its shaft, and screw means joining said actuator to said slide for adjusting said actuator relatively to said slide in a direction parallel to said shutter shaft.

3. In a motion picture projector, a main housing, a shutter shaft and a framing shaft journalled therein, a shutter fixed non-slidably on said shutter shaft, a film driving sprocket, a mechanism for intermittently driving said sprocket, the said mechanism comprising a sleeve mounted in said main housing, a shaft journalled in said sleeve having a star wheel mounted on one end thereof and the said film driving sprocket mounted exteriorly of said housing on the other end thereof, a housing for said intermittent mechanism rockably mounted on said sleeve, a shaft journalled in said housing having a disk mounted on an end thereof, a pin on said disk adapted to engage slots in said star wheel to intermittently drive the same, means including a gear train interposed between said framing shaft and said intermittent mechanism housing for effecting adjustment of the same about said sleeve, a slide on said framing shaft, means on said framing shaft for moving said slide on rotation of the shaft, a helical gear slidably keyed on said shutter shaft, a driving gear in said main housing meshing with said helical gear, a rigid actuator from said slide to the helical gear for sliding the latter on its shaft, and an adjusting screw joining said actuator to said slide for adjusting said actuator relatively to said slide in a direction parallel to said shutter shaft.

KARL BRENKERT.

REFERENCES CITED

The following references are of record in the file of this patent:

UNITED STATES PATENTS

| Number | Name | Date |
|---|---|---|
| 1,407,905 | Wenderhold | Feb. 28, 1922 |
| 1,428,531 | Chambless | Sept. 12, 1922 |
| 1,884,610 | Dina | Oct. 25, 1932 |

FOREIGN PATENTS

| Number | Country | Date |
|---|---|---|
| 10,779 | Great Britain | 1910 |
| 348,119 | Great Britain | Jan. 28, 1922 |
| 432,109 | Great Britain | July 22, 1935 |